May 8, 1934. R. A. FORESMAN 1,957,583
COMBUSTION APPARATUS
Filed Aug. 7, 1931
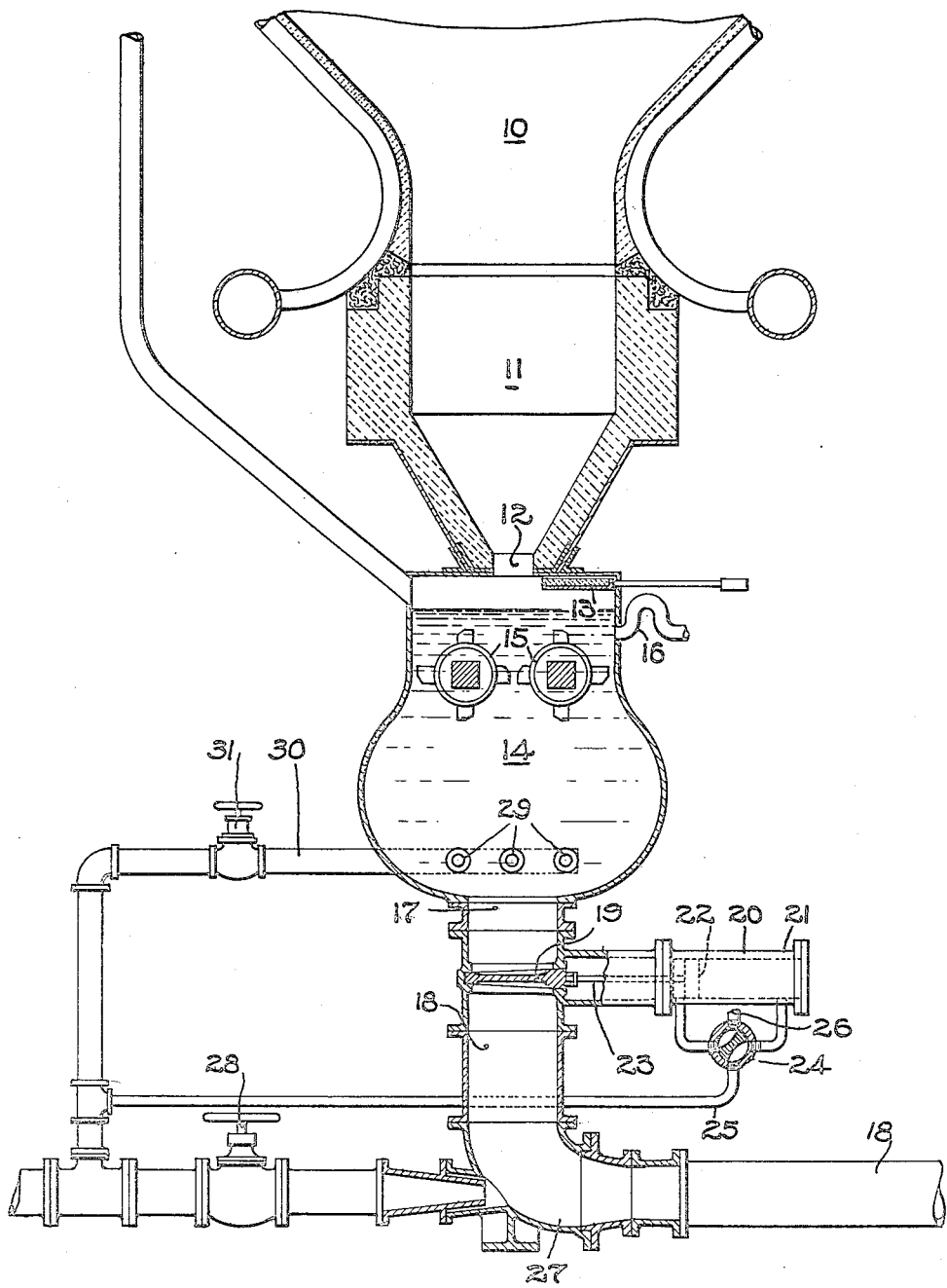
WITNESS
C. L. Hoars
INVENTOR
ROBERT A. FORESMAN.
BY
A. B. Reeves
ATTORNEY Patented May 8, 1934

1,957,583

UNITED STATES PATENT OFFICE 1,957,583

COMBUSTION APPARATUS

Robert A. Foresman, Moores, Pa., assignor to Westinghouse Electric & Manufacturing Company, a corporation of Pennsylvania Application August 7, 1931, Serial No. 555,761

11 Claims. (Cl. 110—171)

My invention relates to combustion apparatus and more particularly to refuse disposal means for use in conjunction with pulverized fuel furnaces, from which the refuse is discharged, at least partly, in a molten state.

It is an object of this invention to provide apparatus of the character referred to which provides for the storage, for extended periods of time, of the refuse from the furnace and for periodically removing such stored refuse in a relatively short period of time and in effective and efficient manner.

It is also an object of this invention to provide an improved method of disposing of molten refuse from pulverized fuel furnaces.

It is a further object to provide an apparatus of the character outlined which provides for the disposal of the refuse and at the same time prevents the infiltration of outside air and the escapement of obnoxious gases or vapors.

A still further object is to provide apparatus of this character, which is durable, simple, and which is comparatively cheap to manufacture and to maintain.

These and other objects are effected by my invention, as will be apparent from the following description and claims taken in connection with the accompanying drawing, in which:

The single figure illustrates somewhat diagrammatically a preferred embodiment of my improved apparatus and a preferred mode of carrying out my improved method.

According to a specific aspect of my invention my improved apparatus and method comprises the following: providing for the flow of molten refuse from a pulverized fuel furnace into a water-filled storage pit or receptacle, the water providing for the chilling and breaking up of such refuse; assisting the chilling action by providing means for crushing the refuse after it has entered the water so as to effect a more intimate contact between the water and refuse and to reduce the refuse to small particles; providing for the interruption of the flow of refuse into the receptacle; providing for the periodic emptying of the receptacle of the mixture of refuse and water and at the same time applying high velocity jets of water to the mixture so as to maintain the refuse in suspension in the water and thereby assist in its removal from the receptacle; and lastly in refilling the receptacle with water.

By reason of the fact that I provide a water-filled storage receptacle with crushing means submerged in the water, the refuse is completely chilled and broken up without damaging the crushing means. The flow of refuse is interrupted at least during the sluicing period, so as to prevent the infiltration of air into the furnace and to prevent the molten refuse from entering the pit while there is not sufficient water therein to protect the parts. The pit provides for storage of the refuse from the furnace for long periods of time, and the water within the pit in conjunction with the high velocity jets of water, provide for quickly and effectively removing the refuse from the pit.

Referring now in detail to the construction illustrated, the reference numeral 10 indicates the lower portion of a conventional type of pulverized fuel furnace. A refuse discharge passage 11 is provided for conducting molten refuse out of the furnace. The passage 11 terminates in a restricted outlet opening 12. A gate 13 which may be either mechanically operated or operated by hand, serves to close the discharge opening 12, or if desired, to restrict the flow of molten refuse from the furnace.

I provide a pit 14 for receiving the molten refuse as it is discharged through the outlet 12 and for storing such refuse for extended periods of time. The pit is so constructed and arranged with respect to the outlet opening 12 that infiltration of outside air into the furnace and also the escapement of obnoxious gases and vapors from the furnace is prevented.

During storage periods the pit is maintained full of water as indicated, and refuse crushing means in the form of grinder rolls 15 are disposed in the upper portion of the pit and are submerged within the water. Molten ash entering the pit through the opening 12 is chilled by its contact with the water and broken into relatively small pieces. The grinder rolls preferably rotate toward one another and serve to assist in the chilling action by increasing the area of the surface of the material exposed to the water. They also serve to break up and reduce the chilled refuse to still smaller particles so that it may be readily removed from the pit when desired.

An inverted U-shaped overflow pipe 16 serves to prevent the water from going above a predetermined level and serves to maintain a seal which prevents the infiltration of outside air into the pit during the time the refuse is being stored and prevents the escapement of obnoxious gases and vapors. When the refuse is being removed from the pit, pipe 16 serves as a vacuum breaking device and prevents any damage being done to the parts such as would be caused by the outrush of water and refuse causing a sufficient pressure difference between the pit and the furnace as to result in the flame sweeping down into the pit. The pipe 16 prevents the latter condition, during the removal period, by providing for the maintenance of the upper portion of the pit at atmospheric pressure.

The pit 14 is provided with an outlet opening 17 in the lower portion thereof and a sluice pipe or conduit 18 connects with this opening. A valve 19 of the gate type is disposed in the pipe 18 and serves to control the flow of refuse and water from the pit. The valve 19 may be operated by a servo-motor 20 comprising a cylinder 21, piston 22 and stem 23 connecting the piston and the valve. Operation of the servo-motor is effected by manipulation of a 4-way valve 24 which serves to connect water under pressure from a pipe 25 to either side of the piston 22, and at the same time to connect the other side of the piston with an exhaust pipe 26.

In order to provide for the positive translation of the refuse and water to a suitable final point of discharge, I provide a water-motivated ejector 27 disposed within the pipe 18 beneath the valve 19. Flow of motivating water to the ejector may be controlled by a suitable valve 28. I also provide within the pit a plurality of water jets 29 which are supplied with water under pressure from a pipe 30, a valve 31 serving to control the flow of water to the jets.

Having thus described the details of the preferred embodiment of my invention, the operation thereof is as follows:

The molten refuse forming in the furnace flows into the water-filled ash pit through the discharge opening 12. This may be either continuous or periodical, depending on which operation is preferred. As stated, the refuse is chilled and broken up as it enters the pit by reason of its contact with the water within the pit and also by reason of the action of the grinder rolls 15. The crushed refuse settles within the lower portion of the pit; and, when sufficient refuse has accumulated, the water jets 29 are turned on to stir up the refuse and water, the gate valve 19 is opened by proper manipulation of the valve 24, and then the refuse and water flow out of the pit. Previous to the opening of the gate valve, the ejector is placed in operation by opening of the valve 28, the water and refuse from the pit are then forced along the sluice pipe to the final point of discharge by the ejector. During discharge, the water issuing from the jets 29 serves the additional purpose of maintaining the inlet of the ejector sealed or primed and thereby provides for efficient operation of the ejector. When the water and refuse are out of the pit, the gate valve 19 is closed and the water issuing from the jets serves to refill the pit. When this has been accomplished, the valve 31 is closed. The ejector 27 is shut off after the closing of the gate valve by closing the valve 28.

From the above it will be readily seen that I have devised both an improved method and an improved apparatus by means of which the molten refuse from pulverized fuel furnaces is removed in a highly efficient manner. The apparatus is extremely simple, durable and cheap to manufacture and maintain. Its operation is also extremely simple.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In combustion apparatus, the combination of a pulverized fuel furnace of the type wherein refuse is discharged therefrom in a molten condition and including a discharge outlet for the molten refuse; a water-filled pit disposed to receive the molten refuse as it is discharged from said outlet; means for controlling the flow of molten refuse through the outlet and into the pit; the pit having a discharge outlet in the lower portion thereof; a sluice conduit disposed to receive the refuse and water as it flows through the last-named discharge outlet; valve means for controlling the flow of refuse and water through the last-named discharge outlet; means for opening and closing the valve means; and fluid translating means for forcing the refuse and water through the sluice conduit when the valve means is open.

2. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; the pit having a discharge outlet in the lower portions thereof; refuse crushing means disposed within the pit in position to act on the stream of refuse as it is discharged from the furnace; said crushing means being submerged within the water; a sluice conduit disposed to receive the refuse and water as it flows through the last-named discharge outlet; valve means controlling the flow of refuse and water through the last-named discharge outlet; means for opening and closing the valve means; and fluid translating means for forcing the refuse and water through the sluice conduit when the valve means is open.

3. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; means for controlling the flow of molten slag through the discharge outlet; the pit having a discharge outlet in the lower portion thereof; a sluice pipe disposed to receive the refuse and water as it flows through the last-named discharge outlet; valve means controlling the flow of refuse and water through the last-named discharge outlet; means for opening and closing the valve means; and an ejector disposed within the sluice pipe for translating the refuse and water therethrough when the valve means is open.

4. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; means for controlling the flow of molten refuse through the discharge outlet; refuse crushing means disposed within the pit in position to act on the stream of refuse as it is discharged from the furnace; said crushing means being submerged within the water; the pit having a discharge outlet in the lower portion thereof; a sluice conduit disposed to receive the refuse and water as it flows through the last-named discharge outlet; valve means controlling the flow of refuse and water and through the last-named discharge outlet; means for opening and closing the valve means; and a fluid translating means for forcing the refuse and water through the sluice conduit when the valve means is open.

5. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; means for controlling the flow of molten refuse through the discharge outlet; the pit having a discharge outlet in the lower portion thereof; jet means for directing water at high velocities into the interior of the pit; a sluice conduit disposed to receive the refuse and water as it flows through the last-named discharge outlet; valve means controlling the flow of refuse and water through the last-named discharge outlet; means for opening and closing the valve means; a fluid translating means for forcing the refuse and water through the sluice conduit when the valve means is open.

6. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; refuse crushing means disposed within the pit in position to act on the stream of refuse as it is discharged from the furnace; said crushing means being submerged within the water; the pit having a discharge outlet in the lower portion thereof; a sluice pipe disposed to receive the refuse and water as it flows through the last-named discharge outlet; valve means controlling the flow of refuse and water through the last-named discharge outlet; means for opening and closing the valve means; and an ejector disposed within the sluice pipe for translating the refuse and water therethrough when the valve means is open.

7. In combustion apparatus, the combination of pulverized fuel furnace of the type wherein refuse is discharged therefrom in a molten condition and including a discharge outlet for the molten refuse; a water-filled refuse pit disposed to receive the molten refuse as it is discharged from said outlet; refuse crushing means disposed within the pit in position to act on the stream of refuse as it is discharged from the furnace; said crushing means being submerged within the water; jet means arranged to discharge water at high velocity into the interior of the pit; the pit having a discharge outlet in the lower portion thereof; a sluice conduit disposed to receive the refuse and water as it flows through the last-named discharge outlet; valve means controlling the flow of refuse and water through the last-named discharge outlet; means for opening and closing the valve means; and fluid translating means for forcing the refuse and water through the sluice conduit when the valve means is open.

8. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; means for controlling the flow of molten refuse through the discharge outlet; refuse crushing means disposed within the pit in position to act on the stream of refuse as it is discharged from the furnace; said crushing means being submerged within the water; the pit having a discharge outlet in the lower portion thereof, a sluice pipe disposed to receive the refuse and water as it flows through the last-named discharge outlet; valve means controlling the flow of refuse and water through the last-named discharge outlet; means for opening and closing the valve means; and an ejector disposed within the sluice pipe for translating the refuse and water therethrough when the valve means is open.

9. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; means for controlling the flow of molten refuse through the discharge outlet; jet means for directing water at high velocities into the interior of the pit; the pit having a discharge outlet in the lower portion thereof; a sluice pipe disposed to receive the refuse and water as it flows through the last-named discharge outlet; valve means controlling the flow of refuse and water through the last-named discharge outlet; means for opening and closing the valve means; and an ejector disposed within the sluice pipe for translating the refuse and water therethrough when the valve means is open.

10. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; refuse crushing means disposed within the pit in position to act on the stream of refuse as it is discharged from the furnace; said crushing means being submerged within the water; jet means arranged to direct water at high velocities into the interior of the pit; the pit having a discharge outlet in the lower portion thereof; a sluice pipe disposed to receive the refuse and water through the last-named discharge outlet; valve means controlling the flow of ash and water through the last-named discharge outlet; means for opening and closing the valve means; and an ejector disposed within the sluice pipe for translating the refuse and water therethrough when the valve means is open.

11. In combustion apparatus, the combination of a pulverized fuel furnace of the type wherein refuse is discharged therefrom in a molten condition and including a discharge outlet for the molten refuse; a water-filled refuse pit disposed to receive the molten refuse as it is discharged from said outlet; means for controlling the flow of molten refuse through the discharge outlet; refuse crushing means disposed within the pit in position to act on the stream of refuse as it is discharged from the furnace; said crushing means being submerged within the water; jet means arranged to direct high velocity streams of water into the interior of the pit; the pit having a discharge outlet in the lower portion thereof; a sluice pipe disposed to receive the refuse and water as it flows through the last-named discharge outlet; valve means controlling the flow of refuse and water through the last-named discharge outlet; means for opening and closing the valve means; and an ejector arranged within the sluice pipe for translating the refuse and water therethrough when the valve means is open.

ROBERT A. FORESMAN.